(12) United States Patent
Hu

(10) Patent No.: US 11,526,841 B2
(45) Date of Patent: Dec. 13, 2022

(54) ITEM MONITORING METHOD, TERMINAL, AND SYSTEM

(71) Applicant: BOE TECHNOLOGY GROUP CO., LTD., Beijing (CN)

(72) Inventor: Kejun Hu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 203 days.

(21) Appl. No.: 16/535,848

(22) Filed: Aug. 8, 2019

(65) Prior Publication Data

US 2020/0293983 A1 Sep. 17, 2020

(30) Foreign Application Priority Data

Mar. 13, 2019 (CN) .......................... 201910189750.0

(51) Int. Cl.
  G06Q 10/00 (2012.01)
  G06Q 10/08 (2012.01)
  G06Q 10/06 (2012.01)
(52) U.S. Cl.
  CPC ..... G06Q 10/087 (2013.01); G06Q 10/06316 (2013.01)
(58) Field of Classification Search
  CPC ...................... G06Q 10/087; G06Q 10/06316
  USPC ..................................................... 705/16, 28
  See application file for complete search history.

(56) References Cited

U.S. PATENT DOCUMENTS

| 7,865,398 | B2 | 1/2011 | Schon |
| 2005/0071234 | A1 | 3/2005 | Schon |
| 2008/0055278 | A1* | 3/2008 | Locker ................... G08B 21/24 345/179 |
| 2008/0251575 | A1* | 10/2008 | Bowling .............. G11B 27/034 235/375 |
| 2015/0302234 | A1 | 10/2015 | Mats et al. |

FOREIGN PATENT DOCUMENTS

| CN | 1624715 A | 6/2005 |
| CN | 102902992 A | 1/2013 |
| CN | 203108813 U | 8/2013 |
| CN | 107145917 A | * 9/2017 |
| CN | 107902317 A | 4/2018 |
| CN | 108763995 A | 11/2018 |

(Continued)

OTHER PUBLICATIONS

First Office Action, including Search Report, for Chinese Patent Application No. 201910189750.0, dated Sep. 27, 2020, 14 pages.

*Primary Examiner* — Rokib Masud

(74) *Attorney, Agent, or Firm* — Westman, Champlin & Koehler, P.A.

(57) ABSTRACT

The present disclosure discloses an item monitoring method, terminal and system. The item monitoring method includes: scanning a radio frequency identification tag of an item within a preset range according to a preset scanning period using radio frequency identification technology, and acquiring item information in the radio frequency identification tag; determining whether the item corresponding to the item information belongs to an item scope covered by the preset range; and outputting first prompt information in response to determining that the item corresponding to the item information does not belong to the item scope covered by the preset range.

11 Claims, 4 Drawing Sheets

(56) References Cited

FOREIGN PATENT DOCUMENTS

| | | | |
|---|---|---|---|
| CN | 108876242 A | | 11/2018 |
| CN | 108960366 A | | 12/2018 |
| CN | 109190964 A | * | 1/2019 |
| CN | 109190964 A | | 1/2019 |

* cited by examiner

ITEM MONITORING METHOD, TERMINAL, AND SYSTEM

CROSS-REFERENCE TO RELATED APPLICATION(S)

This application claims priority to the Chinese Patent Application No. 201910189750.0, filed on Mar. 13, 2019, entitled "ITEM MONITORING METHOD, TERMINAL, AND SYSTEM", which is incorporated herein by reference in its entirety.

TECHNICAL FIELD

The present disclosure relates to the field of Internet of things technology, and more particularly, to an item monitoring method, terminal, and system.

BACKGROUND

Currently, item storage places such as storehouses, warehouses etc. still have low degrees of informatization and intelligence. Here, operations of putting items in a warehouse and taking items out of a warehouse still mainly comprise manual operations and manual verifications. Due to a wide variety of items and complex numbers, it is easy to wrongly take items, misplace items, take excessive items, inaccurately identify put-in or take-out of items, mistakenly count a number of items, and wrongly update data, etc.

SUMMARY

According to a first aspect of the embodiments of the present disclosure, there is proposed an item monitoring method, including:

scanning a radio frequency identification tag of an item within a preset range according to a preset scanning period using radio frequency identification technology, and acquiring item information in the radio frequency identification tag;

determining whether the item corresponding to the item information belongs to an item scope covered by the preset range; and outputting first prompt information in response to determining that the item corresponding to the item information does not belong to the item scope covered by the preset range.

According to some embodiments, the method further includes:

acquiring tag information in the radio frequency identification tag;

determining whether the item corresponding to the tag information is a new item according to the tag information; and storing, in response to determining that the item corresponding to the tag information is a new item, item information and tag information of the new item, and uploading the item information and the tag information of the new item to a server.

According to some embodiments, the method further includes:

determining whether the new item belongs to the item scope covered by the preset range;

outputting second prompt information in response to determining that the new item belongs to the item scope covered by the preset range; and outputting the first prompt information in response to determining that the new item does not belong to the item scope covered by the preset range.

According to some embodiments, the method further includes:

acquiring an item pick-up task list;

scanning a radio frequency identification tags of an item within the preset range according to the preset scanning period and generating an item storage list;

comparing an item storage list which is currently obtained by scanning with an item storage list which is previously obtained by scanning to obtain different item information;

determining whether items corresponding to the different item information belong to the item pick-up task list;

outputting third prompt information in response to determining that the items corresponding to the different item information belong to the item pick-up task list; and outputting fourth prompt information in response to determining that the items corresponding to the different item information do not belong to the item pick-up task list.

According to some embodiments, the method further includes:

determining whether a number of the items corresponding to the different item information is consistent with a number of corresponding items to be picked up in the item pick-up task list, and outputting fifth prompt information in response to determining that the number of items corresponding to the different item information is not consistent with the number of the corresponding items to be picked up in the item pick-up task list.

According to some embodiments, the method further includes:

displaying the item pick-up task list and the different item information.

According to a second aspect of the embodiments of the present disclosure, there is proposed an item monitoring terminal, including:

a scanning identification circuit configured to scan a radio frequency identification tag of an item within a preset range according to a preset scanning period using radio frequency identification technology, and acquire item information in the radio frequency identification tag;

a processing circuit configured to determine whether the item corresponding to the item information belongs to an item scope covered by the preset range; and an output circuit configured to output first prompt information if the item corresponding to the item information does not belong to the item scope covered by the preset range.

According to some embodiments, the scanning identification circuit is further configured to acquire tag information in the radio frequency identification tag;

the processing circuit is further configured to determine whether the item corresponding to the tag information is a new item according to the tag information; and the terminal further includes a memory configured to store item information and tag information of a new item if the item corresponding to the tag information is a new item.

According to some embodiments, the terminal further includes a transmitting circuit configured to upload the item information and the tag information of the new item to a server.

According to some embodiments, the processing circuit is further configured to determine whether the new item belongs to the item scope covered by the preset range; and the output circuit is further configured to:

output second prompt information if the new item belongs to the item scope covered by the preset range; and output the first prompt information if the new item does not belong to the item scope covered by the preset range.

According to some embodiments, the terminal further includes a receiving circuit configured to acquire an item pick-up task list;

the scanning identification circuit is further configured to scan radio frequency identification tags of items within the preset range according to the preset scanning period and generate an item storage list;

the processing circuit is further configured to compare an item storage list which is currently obtained by scanning with an item storage list which is previously obtained by scanning to obtain different item information, and determine whether items corresponding to the different item information belong to the item pick-up task list; and the output circuit is further configured to:

output third prompt information if the items corresponding to the different item information belong to the item pick-up task list; and output fourth prompt information if the items corresponding to the different item information do not belong to the item pick-up task list.

According to some embodiments, the processing circuit is further configured to determine whether a number of items corresponding to the different item information is consistent with a number of corresponding items to be picked up in the item pick-up task list, and the output circuit is further configured to:

output fifth prompt information if the number of items corresponding to the different item information is not consistent with the number of the corresponding items to be picked up in the item pick-up task list.

According to some embodiments, the terminal further includes: a display configured to display the item pick-up task list and the different item information.

According to a third aspect of the embodiments of the present disclosure, there is proposed an item monitoring system, including a server, and the item monitoring terminal described above, wherein the server is configured to store item information and tag information of all items which are currently stored in the item monitoring terminal.

According to some embodiments, the system further includes a task issuing terminal configured to transmit an item pick-up task list to the item monitoring terminal.

According to some embodiments, the system further includes a gateway configured to enable communication between the server and the task issuing terminal and the item monitoring terminal.

BRIEF DESCRIPTION OF THE ACCOMPANYING DRAWINGS

In order to more clearly illustrate the technical solutions according to the embodiments of the present disclosure, the accompanying drawings of the embodiments will be briefly described below. It is obvious that the accompanying drawings in the following description relate only to some embodiments of the present disclosure, and are not to limit the present disclosure.

DETAILED DESCRIPTION

In order to make the purposes, technical solutions and advantages of the embodiments of the present disclosure more clear, the technical solutions according to the embodiments of the present disclosure will be clearly and completely described below in conjunction with the accompanying drawings of the embodiments of the present disclosure. It is obvious that the embodiments described are a part of the embodiments of the present disclosure, instead of all the embodiments. All other embodiments obtained by those of ordinary skill in the art based on the described embodiments of the present disclosure without any creative work are within the protection scope of the present disclosure.

Unless otherwise defined, technical terms or scientific terms used in the present disclosure should be interpreted in the ordinary sense for those of ordinary skill in the art to which the present disclosure belongs. The words such as "first," "second," etc. used in the present disclosure do not mean any order, quantity or importance, but merely serve to distinguish different constituent parts. Similarly, the word such as "a", "an", or "the" etc. also does not mean limitations on quantity, and instead means presence of at least one. The word such as "including" or "comprising" etc. means that an element or item preceding the word covers elements or items which appear after the word and their equivalents, but does not exclude other elements or items. The word "connected" or "connecting" etc. is not limited to physical or mechanical connections but may comprise electrical connections, regardless of direct connections or indirect connections. "Upper", "lower", "left", "right", etc. are only used to indicate a relative positional relationship, and after an absolute position of an object which is described changes, the relative positional relationship may also change accordingly.

According to an embodiment of the present disclosure, there is proposed an item monitoring method, which may at least partially address the matter that an item is misplaced.

Figure 1:
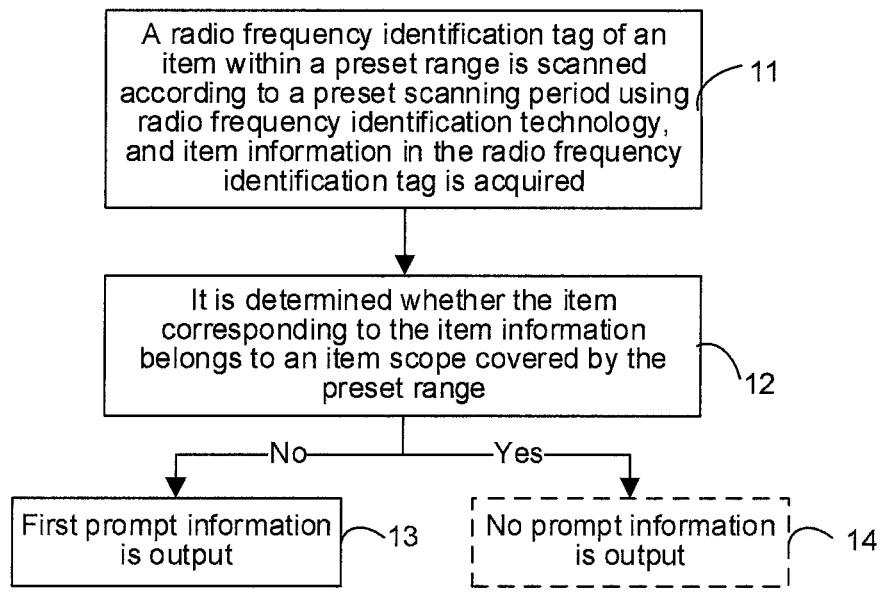
FIG. 1 is a schematic flowchart of an item monitoring method according to an embodiment of the present disclosure.

As shown in FIG. 1, the item monitoring method is applied to an item monitoring terminal, and comprises the following steps.

In step 11, a radio frequency identification tag of an item within a preset range is scanned according to a preset scanning period using radio frequency identification technology, and item information in the radio frequency identification tag is acquired.

Here, the radio frequency identification technology is RFID technology, and the radio frequency identification tag may be an RFID tag disposed on an item or an outer package of the item, has item information stored therein, and may be read by the item monitoring terminal. According to some embodiments, the item information comprises information such as an item name, a model number, etc. Each item within the preset range is provided with a radio frequency identification tag, and the item information is usually initially configured in the radio frequency identification tag corresponding to the item.

According to some embodiments, the preset scanning period is a time required for the item monitoring terminal to scan all items within the preset range, and a value of the preset scanning period may be set as, for example, 3 seconds, 5 seconds, etc. according to requirements. If the item monitoring terminal reads a certain radio frequency identification tag by scanning during the preset scanning period, it may be determined that an item corresponding to the radio frequency identification tag is placed within a preset range monitored by the item monitoring terminal.

According to some embodiments, when the item monitoring terminal operates normally, it may periodically perform scanning continuously at a high speed (at an identification rate up to 500 sheets/second or more), read radio frequency identification tags of all items within the preset range thereof, form a tag information table (comprising item names, model numbers, chip Identities (IDs), etc.), store the tag information table in a flash and maintain a status of the table (for example, update the table according to new information on added or removed items, etc.)

According to some embodiments, the item monitoring terminal is placed at its corresponding position and configured to manage one or more items; and the preset range refers to a range monitored or managed by the item monitoring terminal. For example, in a storehouse scenario, the range monitored or managed by the item monitoring terminal may be a shelf on which the item monitoring terminal is installed, or all shelves that may be covered by a signal of the item monitoring terminal etc. The preset range may be set according to requirements of the application scenario, and is not specifically limited here.

According to some embodiments, an RFID read/write function of the item monitoring terminal is implemented by an Ultra-High Frequency (UHF) RFID read/write module, and an operating frequency band thereof is 840-960 MHz. With the cooperation of a standard 2 dBi antenna, and with the cooperation of a simple power supply and interface circuit, the item monitoring terminal may achieve a reading distance up to 2 meters and a reading speed >200 items/sec, which may make it possible to quickly build an RFID system with a low cost, which has characteristics such as a small volume, a reliable operation, ease to use, a low price etc. Here, a shape and a gain of an external antenna of the item monitoring terminal may be specifically designed according to shapes and a spacing of shelves in an actual storehouse. The RFID antenna here may be a directional antenna fixed on the top of the shelves, and is implemented using a UHF circularly polarized narrow beam antenna, which has characteristics such as directionality, a high gain, miniaturization, etc. An antenna gain and a beam range of the RFID antenna and a gain of the RFID read/write module may also be debugged and designed according to a real situation to achieve detection of an RFID tag in a directional range thereof.

According to some embodiments, considering that the item monitoring terminal needs to process a plurality of tasks, comprising a registration task, a heartbeat task, an RFID scanning task, etc., which have certain requirements on real-time performance, in terms of software architecture, software architecture of the item monitoring terminal may be implemented based on a real-time multitasking operating system (μCOS operating system).

In step 12, it is determined whether the item corresponding to the item information belongs to an item scope covered by the preset range.

According to some embodiments, the item monitoring terminal locally stores a list of an item scope covered by its preset range. The item information may be compared with the list, and when item information which is obtained by scanning does not match any item information in the list, it indicates that an item corresponding to the item information does not belong to the item scope covered by the preset range, that is, an event that an item is misplaced occurs. According to some embodiments, the list of the item scope covered by the preset range may also be updated, for example, by manual operation of a staff member, or by an update instruction issued by a server, etc.

In step 13, in response to determining that the item corresponding to the item information does not belong to the item scope covered by the preset range, which indicates that an event that an item is misplaced occurs, first prompt information is output. According to some embodiments, the first prompt message is a warning message, which is used to remind a relevant person that an event that an item is misplaced occurs.

According to some embodiments, the first prompt information may be output by means of voice broadcast, screen display, etc. According to some embodiments, an indicator light is provided on a shelf where an item is placed or the item monitoring terminal, and the first prompt information may be provided by lighting a red indicator light, which may be lighten in a mode of being always bright or blinking, etc.

In step 14, in response to determining that the item corresponding to the item information belongs to the item scope covered by the preset range, no prompt information may be output.

It may be seen from the above embodiment that in the item monitoring method according to the embodiment of the present disclosure, the radio frequency identification tag of the item within the preset range is scanned using radio frequency identification technology, and it is determined whether there is an item which does not belong to the item scope covered by the preset range according to a scanning result, and when there is an item which does not belong to a shelf domination range, the first prompt information is output to remind a warehouse staff member. With the item monitoring method, regular automatic scanning is realized using radio frequency identification technology without manually scanning items, which saves a lot of manpower, and it is determined whether there is a misplacement behavior by automatically comparing item information and a corresponding prompt is provided, which achieves highly efficient and accurate detection of items put in or taken out of a warehouse.

Figure 2:
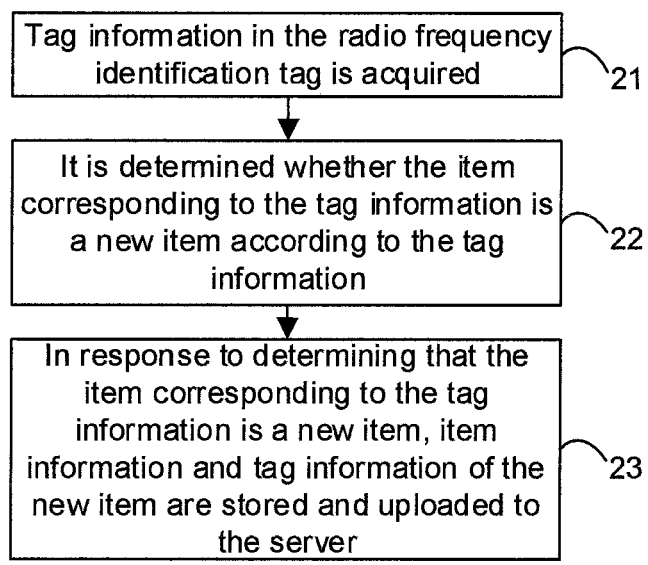
FIG. 2 is a schematic flowchart of a process of determining a new item according to an embodiment of the present disclosure.

As an alternative embodiment, as shown in FIG. 2, the item monitoring method further includes the following steps.

In step 21, tag information in the radio frequency identification tag is acquired.

In addition to the above item information, each radio frequency identification tag has a unique tag ID for identifying the radio frequency identification tag, and the tag information comprises the tag ID. When the item monitoring terminal scans the radio frequency identification tag, the item monitoring terminal may read the tag information thereof, to identify the tag ID of the radio frequency identification tag.

In step 22, it is determined, according to the tag information, whether the item corresponding to the tag information is a new item.

According to some embodiments, the item monitoring terminal scans radio frequency identification tags of items within the preset range using radio frequency identification technology in an initial state, obtains corresponding tag information and item information, and then stores the tag information and the item information as an item storage list. In a subsequent process, the item monitoring terminal updates the item storage list by periodic scanning and synchronizes the item storage list to the server.

After items are put into a warehouse or taken out of a warehouse each time, the item monitoring terminal correspondingly updates the item storage list according to a scanning result. Each time when items are put into a warehouse or taken out of a warehouse, it may be determined which items are new items by comparing an item storage list which is previously obtained by scanning with an item storage list which is currently obtained by scanning. Specifically, since tag IDs are unique, when a tag ID does not exist in the item storage list which is previously obtained by scanning, it indicates that an item corresponding to the tag ID is a new item.

In step 23, in response to determining that the item corresponding to the tag information is a new item, item information and tag information of the new item are stored and the item information and the tag information of the new item are uploaded to the server.

According to some embodiments, the item monitoring terminal stores the item storage list which is currently obtained by scanning in its flash while periodically performing scanning. A Micro-Control Unit (MCU) of the item monitoring terminal compares the tag information table which is currently obtained by scanning with the tag information table which is previously obtained by scanning, and pushes changed item information and changed tag information into a message queue, which will be transmitted to the server when a connection is established subsequently with the server.

In addition, if the item corresponding to the tag information is not a new item, that is, the tag ID already exists in the item storage list which is previously obtained by scanning, it is regarded as an existing item and no processing is done, and no prompt is provided.

Since each item has a unique tag ID, it is determined whether the corresponding item is a new item according to the tag information, so that when there is a new item which is put in a warehouse, the corresponding item information and tag information of the item are stored and synchronized to the server, to achieve unified management of items.

Figure 3:
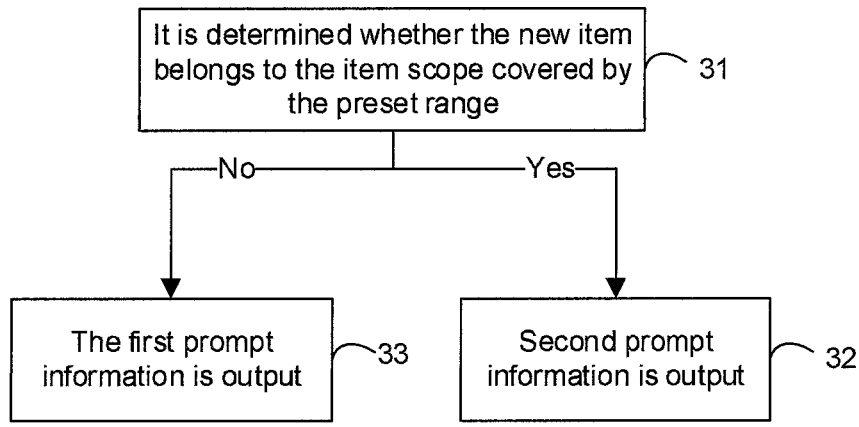
FIG. 3 is a schematic flowchart of a process of determining whether a new item is misplaced according to an embodiment of the present disclosure.

As an alternative embodiment, as shown in FIG. 3, the item monitoring method further includes the following steps.

In step 31, it is determined whether the new item belongs to the item scope covered by the preset range.

After the item is placed within the preset range monitored by the item monitoring terminal, the item monitoring terminal obtains the item information in the radio frequency identification tag thereof by periodic scanning, and then reads information such as an item name and a model number stored in the item information. After the above information is acquired, it is determined, according to the item name and the model number, whether the item belongs to the item scope covered by the preset range.

In step 32, in response to determining that the new item belongs to the item scope covered by the preset range, which indicates that the new item is a legal new item, second prompt information is output, to remind a relevant person that the item which is placed within the preset range (for example, shelves) monitored by the item monitoring terminal is a legal new item.

According to some embodiments, the second prompt information may be output by means of voice broadcast, screen display, etc. According to some embodiments, an indicator light is provided on a shelf where an item is placed or the item monitoring terminal, and the second prompt information may be provided by lighting a green indicator light, which may be lighten in a mode of being always bright or blinking etc.

In step 33, in response to determining that the new item does not belong to the item scope covered by the preset range, which indicates that an event that an item is misplaced occurs, the first prompt information is output. According to some embodiments, the first prompt message is a warning message, which is used to remind a relevant person that an event that an item is misplaced occurs.

According to some embodiments, the first prompt information may be output by means of voice broadcast, screen display, etc. According to some embodiments, an indicator light is provided on a shelf where an item is placed or the item monitoring terminal, and the first prompt information may be provided by lighting a red indicator light, which may be lighten in a mode of being always bright or blinking etc.

In addition, in a next scanning period, if the presence of the new item may still be determined by scanning, which indicates that the new item has been placed within the preset range (such as shelves) monitored by the item monitoring terminal, related information of the new item is stored in the item storage list. In particular, in response to determining that the new item does not belong to the item scope covered by the preset range, the related information thereof is stored in an illegal item list, and the item storage list and the illegal item list are synchronized to the server when a connection is established with the server.

In this way, it is determined whether the new item is a misplaced item (whether it belongs to the item scope covered by the preset range), and then a positive reminder (the second prompt information) is provided in a case where the item is correctly placed, and a warning reminder (the first prompt message) is provided in a case where the item is misplaced, which enables a user to quickly determine whether an event that an item is misplaced occurs.

Figure 4:
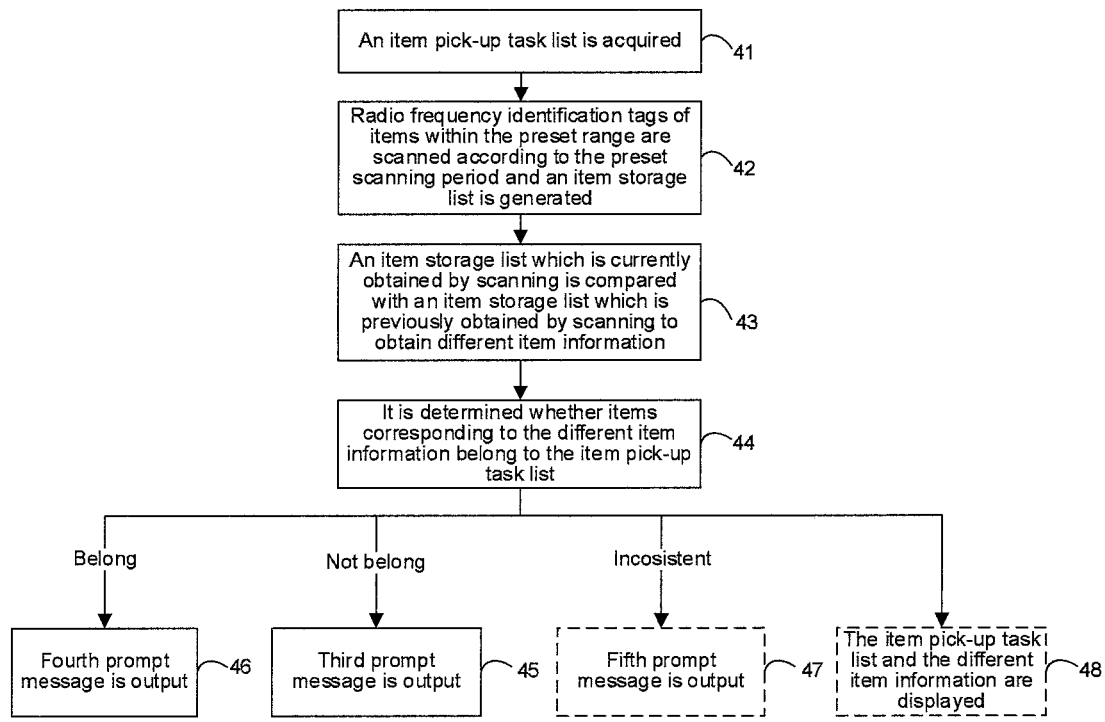
FIG. 4 is a schematic flowchart of an item pick-up process according to an embodiment of the present disclosure.

As an alternative embodiment, as shown in FIG. 4, the item monitoring method further includes the following steps.

In step 41, an item pick-up task list is acquired. Here, the item pick-up task list may be issued by the server, and comprises a list of items which are currently required to be picked up by a staff member from shelves in the monitoring range of the item monitoring terminal.

In step 42, radio frequency identification tags of items within the preset range are scanned according to the preset scanning period and an item storage list is generated.

In step 43, an item storage list which is currently obtained by scanning is compared with an item storage list which is previously obtained by scanning to obtain different item information. Here, the different item information, that is, a difference between the item storage list which is currently obtained by scanning and the item storage list which is previously obtained by scanning, represents the items the user currently picks up.

In step 44, it is determined whether items corresponding to the different item information belong to the item pick-up task list.

In step 45, in response to determining that the items corresponding to the different item information belong to the item pick-up task list, which indicates that the items corresponding to the different item information are items which are picked up by a correct pick-up operation (there is a reduction in items due to a normal item pick-up task list), third prompt message is output, to prompt an operator that the current pick-up operation is correct.

According to some embodiments, the third prompt information may be output by means of voice broadcast, screen display, etc. According to some embodiments, an indicator light is provided on a shelf where an item is placed or the item monitoring terminal, and the third prompt information may be provided by lighting a green indicator light, which may be lighten in a mode of being always bright or blinking etc.

In step 46, in response to determining that the items corresponding to the different item information do not belong to the item pick-up task list, which indicates that the items corresponding to the different item information are items which are picked up by a wrong pick-up operation (the picked items do not exist in the item pick-up task list), the pick-up action is regarded as being illegal, and fourth prompt information is output to prompt the operator that the current pick-up operation is wrong.

According to some embodiments, the fourth prompt information may be output by means of voice broadcast, screen display, etc. According to some embodiments, an indicator light is provided on a shelf where an item is placed or the item monitoring terminal, and the fourth prompt information may be provided by lighting a red indicator light, which may be lighten in a mode of being always bright or blinking etc.

In this way, the current scanning result is compared with the previous scanning result to obtain the different item information, then the different item information is compared with the item pick-up task list, to determine whether the pick-up operation is correct, and when the items are picked up correctly, a positive reminder (the third prompt message) is provided, and when the items are picked up wrongly, a warning reminder (the fourth prompt message) is provided to enable the user to quickly determine whether there is an event that an item is wrongly picked up.

According to some embodiments, the item monitoring method further includes the following step.

In step 47, it is determined whether a number of items corresponding to the different item information is consistent with a number of corresponding items to be picked up in the item pick-up task list, and fifth prompt information is output in response to determining that the number of items corresponding to the different item information is not consistent with the number of the corresponding items to be picked up in the item pick-up task list, to remind the operator that there is a wrong number of picked items due to the current pick-up operation.

According to some embodiments, the method for determining that the number of picked items is inconsistent may be to count a number of each type of picked items, and when a number of a certain type of picked items is different from a number of items to be picked up in the item pick-up task list, it is determined that the number of picked items is inconsistent.

According to some embodiments, the fifth prompt information may be output by means of voice broadcast, screen display, etc. According to some embodiments, an indicator light is provided on a shelf where an item is placed or the item monitoring terminal, and the fifth prompt information may be provided by lighting a red indicator light, which may be lighten in a mode of being always bright or blinking etc.

According to some embodiments, the item monitoring method further includes the following step.

In step 48, the item pick-up task list and the different item information are displayed. In this way, the item pick-up task list is displayed, so that the user may complete pick-up of items with the cooperation of displaying the different item information for the user's reference.

According to some embodiments, step 48 may be to display the item pick-up task list and the different item information in real time in the pick-up process, so that the user may be reminded of the items the user currently picks up in real time.

In addition, as an alternative implementation, if the items corresponding to the different item information do not belong to the item pick-up task list, but belong to the illegal item list, no reminder may be provided.

According to an embodiment of the present disclosure, there is proposed an item monitoring terminal, which may at least partially address the matter that an item is misplaced.

Figure 5:
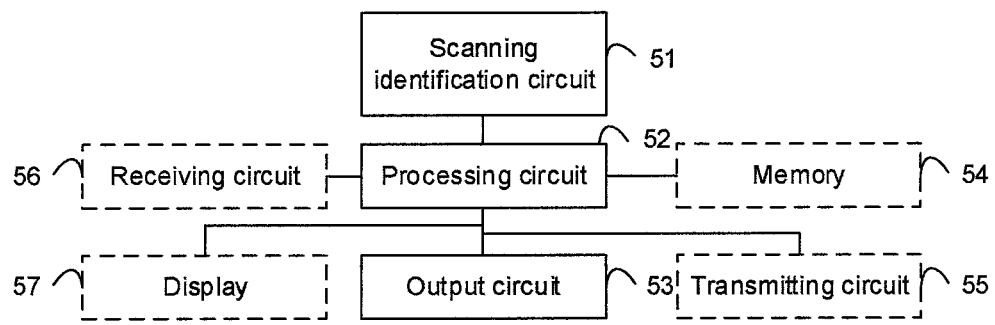
FIG. 5 is a schematic structural diagram of an item monitoring terminal according to an embodiment of the present disclosure.

As shown in FIG. 5, the item monitoring terminal includes a scanning identification circuit 51, a processing circuit 52, and an output circuit 53.

The scanning identification circuit 51 is configured to scan a radio frequency identification tag of an item within a preset range according to a preset scanning period using radio frequency identification technology, and acquire item information in the radio frequency identification tag.

Figure 6:
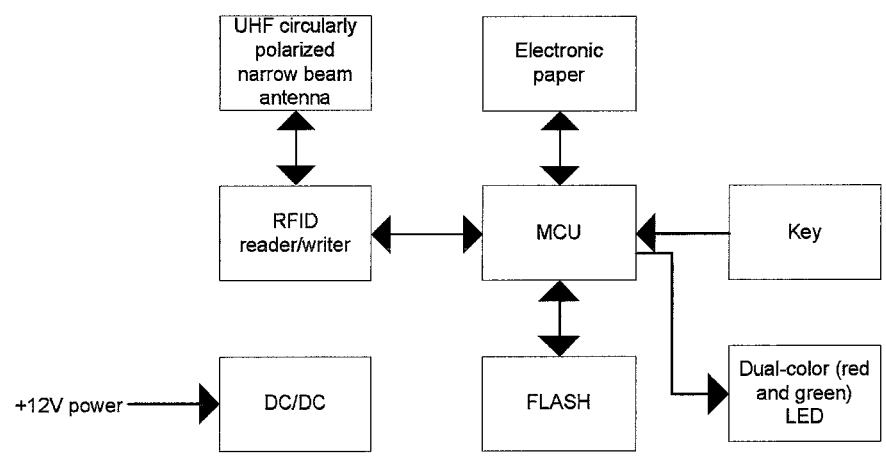
FIG. 6 is a schematic hardware structural diagram of an item monitoring terminal according to an embodiment of the present disclosure.

According to some embodiments, an RFID read/write function (i.e., the scanning identification circuit 51) of the item monitoring terminal is implemented by an Ultra-High Frequency (UHF) RFID read/write module, and may specifically comprise a UHF circularly polarized narrow beam antenna and a RFID reader/writer (as shown in FIG. 6) with an operating frequency band of 840-960 MHz. With the cooperation of a standard 2 dBi antenna, and with the cooperation of a simple power supply and interface circuit, the item monitoring terminal may achieve a reading distance up to 2 meters and a reading speed >200 items/sec, which may make it possible to quickly build an RFID system with a low cost, which has characteristics such as a small volume, a reliable operation, ease to use, a low price etc. Here, a shape and a gain of an external antenna of the item monitoring terminal may be specifically designed according to shapes and a spacing of shelves in an actual storehouse. The RFID antenna here may be a directional antenna fixed on the top of the shelves, and is implemented using a UHF circularly polarized narrow beam antenna, which has characteristics such as directionality, a high gain, miniaturization, etc. An antenna gain and a beam range of the RFID antenna and a gain of the RFID read/write module may also be debugged and designed according to a real situation to achieve detection of an RFID tag in a directional range thereof.

Here, the radio frequency identification technology is the RFID technology, and the radio frequency identification tag may be an RFID tag disposed on an item or an outer package of the item, has item information stored therein, and may be read by the item monitoring terminal. According to some embodiments, the item information comprises information such as an item name, a model number, etc. Each item within the preset range is provided with a radio frequency identification tag, and the item information is usually initially configured in the radio frequency identification tag corresponding to the item.

According to some embodiments, the preset scanning period is a time required for the item monitoring terminal to scan all items within the preset range, and a value of the preset scanning period may be set as, for example, 3 seconds, 5 seconds, etc. according to requirements. If the item monitoring terminal reads a certain radio frequency identification tag by scanning during the preset scanning period, it may be determined that an item corresponding to the radio frequency identification tag is placed within a preset range monitored by the item monitoring terminal.

According to some embodiments, when the item monitoring terminal operates normally, it may periodically perform scanning continuously at a high speed (at an identification rate up to 500 sheets/second or more), read radio frequency identification tags of all items within the preset range thereof, form a tag information table (comprising item names, model numbers, chip Identities (IDs), etc.), store the tag information table in a flash as shown in FIG. 6 and maintain a status of the table (for example, update the table according to new information on added or removed items etc.)

According to some embodiments, the item monitoring terminal is placed at its corresponding position and is configured to manage one or more items; and the preset range refers to a range monitored or managed by the item monitoring terminal. For example, in a storehouse scenario, the range monitored or managed by the item monitoring terminal may be a shelf on which the item monitoring terminal is installed, or all shelves that may be covered by a signal of the item monitoring terminal etc. The preset range may be set according to requirements of the application scenario, and is not specifically limited here.

According to some embodiments, considering that the item monitoring terminal needs to process a plurality of tasks, comprising a registration task, a heartbeat task, an RFID scanning task, etc., which have certain requirements on real-time performance, in terms of software architecture, software architecture of the item monitoring terminal may be implemented based on a real-time multitasking operating system (μCOS operating system).

The processing circuit 52 is configured to determine whether the item corresponding to the item information belongs to an item scope covered by the preset range.

In some embodiments, as shown in FIG. 6, the processing circuit 52 may be implemented using a Micro Control Unit (MCU). Specifically, considering the tag reading efficiency and data pressure of the RFID module, a main controller may be implemented using a STM32F4 chip to meet the requirements.

According to some embodiments, the item monitoring terminal locally stores a list of an item scope covered by its preset range, each item information may be compared with the list, and when item information which is obtained by scanning does not match any item information in the list, it indicates that an item corresponding to the item information does not belong to the item scope covered by the preset range, that is, an event that an item is misplaced occurs. According to some embodiments, the list of the item scope covered by the preset range may also be updated, for example, by manual operation of a staff member, or by an update instruction issued by a server, etc.

The output circuit 53 is configured to output first prompt information if the item corresponding to the item information does not belong to the item scope covered by the preset range, which indicates that an event that an item is misplaced occurs. According to some embodiments, if the item corresponding to the item information belongs to the item scope covered by the preset range, no prompt information may be output.

According to some embodiments, the first prompt message is a warning message, which is used to remind a relevant person that an event that an item is misplaced occurs. According to some embodiments, the first prompt information may be output by means of voice broadcast, screen display, etc. According to some embodiments, an indicator light (a dual-color (red and green) indicator light as shown in FIG. 6) is provided on a shelf where an item is placed or the item monitoring terminal, and the first prompt information may be provided by lighting a red indicator light, which may be lighten in a mode of being always bright or blinking etc.

It may be seen from the above embodiment that in the item monitoring terminal according to the embodiment of the present disclosure, the radio frequency identification tag of the item within the preset range is scanned using radio frequency identification technology, and it is determined whether there is an item which does not belong to the item scope covered by the preset range according to a scanning result, and when there is an item which does not belong to a shelf domination range, the first prompt information is output to remind a warehouse staff member. With the item monitoring terminal, regular automatic scanning is realized using radio frequency identification technology without manually scanning items, which saves a lot of manpower, and it is determined whether there is a misplacement behavior by automatically comparing item information and a corresponding prompt is provided, which achieves highly efficient and accurate detection of items put in or taken out of a warehouse.

As an alternative embodiment, the scanning identification circuit 51 is further configured to acquire tag information in the radio frequency identification tag.

In addition to the above item information, each radio frequency identification tag has a unique tag ID for identifying the radio frequency identification tag, and the tag information comprises the tag ID. When the item monitoring terminal scans the radio frequency identification tag, the item monitoring terminal may read the tag information thereof, to identify the tag ID of the radio frequency identification tag.

The processing circuit 52 is further configured to determine whether the item corresponding to the tag information is a new item according to the tag information.

According to some embodiments, the item monitoring terminal scans radio frequency identification tags of items within the preset range using radio frequency identification technology in an initial state, obtains corresponding tag information and item information, and then stores the tag information and the item information as an item storage list. In a subsequent process, the item monitoring terminal updates the item storage list by periodic scanning and synchronizes the item storage list to the server.

After items are put into a warehouse or taken out of a warehouse each time, the item monitoring terminal correspondingly updates the item storage list according to a scanning result. Each time when items are put into a warehouse or taken out of a warehouse, it may be determined which items are new items by comparing an item storage list which is previously obtained by scanning with an item storage list which is currently obtained by scanning. Specifically, since tag IDs are unique, when a tag ID does not exist in the item storage list which is previously obtained by scanning, it indicates that an item corresponding to the tag ID is a new item.

The item monitoring terminal further includes a memory 54 and a transmitting circuit 55. The memory 54 is configured to, if the item corresponding to the tag information is a new item, store item information and tag information of the new item, and the transmitting circuit 54 is configured to upload the item information and the tag information of the new item to the server. According to some embodiments, the memory 54 is implemented using a flash (as shown in FIG. 6). The flash is used to store a font library and an item information table, and a font library chip is used to provide a Chinese font library with three font sizes. According to some embodiments, the transmitting circuit 55 interacts with the server through a gateway. Considering complicated environments such as warehouses and storehouses etc., signal propagation is easily blocked, and thus the wireless communication technology should be selected to have strong penetration and diffraction capability thereof. The transmitting circuit 55 is implemented using a radio frequency transceiver, which is implemented using a Si4463 chip, and supports wide frequency band frequency adjustment and multi-carrier frequency hopping below GHz, high transmission power and receiving sensitivity, low operating power consumption and ultra-low power sleeping.

According to some embodiments, the item monitoring terminal stores the item storage list which is currently obtained by scanning in its flash (as shown in FIG. 6) while periodically performing scanning. The processing circuit 51 (for example, a MCU) of the item monitoring terminal compares the tag information table which is currently obtained by scanning with the tag information table which is previously obtained by scanning, and pushes changed item information and changed tag information into a message queue, which will be transmitted to the server when a connection is established subsequently with the server.

In addition, if the item corresponding to the tag information is not a new item, that is, the tag ID already exists in the item storage list which is previously obtained by scanning, it is regarded as an existing item and no processing is done, and no prompt is provided.

Since each item has a unique tag ID, it is determined whether the corresponding item is a new item according to the tag information, so that when there is a new item which is put in a warehouse, the corresponding item information and tag information of the item are stored and synchronized to the server, to achieve unified management of items.

As an alternative embodiment, the processing circuit 52 is further configured to determine whether the new item belongs to the item scope covered by the preset range. After the item is placed within the preset range monitored by the item monitoring terminal, the item monitoring terminal obtains the item information in the radio frequency identification tag thereof by periodic scanning, and then reads information such as an item name and a model number stored in the item information. After the above information is acquired, it is determined, according to the item name and the model number, whether the item belongs to the item scope covered by the preset range.

The output circuit 53 is further configured to output second prompt information if the new item belongs to the item scope covered by the preset range, which indicates that the new item is a legal new item, to remind a relevant person that the item which is placed within the preset range (for example, shelves) monitored by the item monitoring terminal is a legal new item.

According to some embodiments, the second prompt information may be output by means of voice broadcast, screen display, etc. According to some embodiments, an indicator light is provided on a shelf where an item is placed or the item monitoring terminal, and the second prompt information may be provided by lighting a green indicator light, which may be lighten in a mode of being always bright or blinking etc.

If the new item does not belong to the item scope covered by the preset range, which indicates that an event that an item is misplaced occurs, the first prompt information is output. According to some embodiments, the first prompt message is a warning message, which is used to remind a relevant person that an event that an item is misplaced occurs.

According to some embodiments, the first prompt information may be output by means of voice broadcast, screen display, etc. According to some embodiments, an indicator light is provided on a shelf where an item is placed or the item monitoring terminal, and the first prompt information may be provided by lighting a red indicator light, which may be lighten in a mode of being always bright or blinking etc.

In addition, in a next scanning period, if the presence of the new item may still be determined by scanning, which indicates that the new item has been placed within the preset range (such as shelves) monitored by the item monitoring terminal, related information of the new item is stored in the item storage list. In particular, if the new item does not belong to the item scope covered by the preset range, the related information thereof is stored in an illegal item list, and the item storage list and the illegal item list are synchronized to the server when a connection is established with the server.

In this way, it is determined whether the new item is a misplaced item (whether it belongs to the item scope covered by the preset range), and then a positive reminder (the second prompt information) is provided in a case where the item is correctly placed, and a warning reminder (the first prompt message) is provided in a case where the item is misplaced, which enables a user to quickly determine whether an event that an item is misplaced occurs.

As an alternative embodiment, the item monitoring terminal further includes a receiving circuit 56 configured to acquire an item pick-up task list. According to some embodiments, in addition to a function of uploading data of the transmitting circuit 55, the above radio frequency transceiver may implement a function of receiving an instruction issued by the server from the gateway, that is, the function of the receiving circuit 56.

The scanning identification circuit 51 is further configured to scan radio frequency identification tags of items within the preset range according to the preset scanning period and generate an item storage list. Here, the item pick-up task list may be issued by the server, and comprises a list of items which are currently required to be picked up by a staff member from shelves within the monitoring range of the item monitoring terminal.

The processing circuit 52 is further configured to compare an item storage list which is currently obtained by scanning with an item storage list which is previously obtained by scanning to obtain different item information, and determine whether items corresponding to the different item information belong to the item pick-up task list. Here, the different item information is a difference between the item storage list which is currently obtained by scanning and the item storage list which is previously obtained by scanning, and represents the items the user currently picks up.

The output circuit 53 is further configured to output third prompt message if the items corresponding to the different item information belong to the item pick-up task list, which indicates that the items corresponding to the different item information are items which are picked up by a correct pick-up operation (there is a reduction in items due to a normal item pick-up task list), to prompt an operator that the current pick-up operation is correct. According to some embodiments, the third prompt information may be output by means of voice broadcast, screen display, etc. According to some embodiments, an indicator light is provided on a shelf where an item is placed or the item monitoring terminal, and the third prompt information may be provided by lighting a green indicator light, which may be lighten in a mode of being always bright or blinking etc.

If the items corresponding to the different item information do not belong to the item pick-up task list, which indicates that the items corresponding to the different item information are items which are picked up by a wrong pick-up operation (the picked items do not exist in the item pick-up task list), the pick-up action is regarded as being illegal, and fourth prompt information is output to prompt the operator that the current pick-up operation is wrong.

According to some embodiments, the fourth prompt information may be output by means of voice broadcast, screen display, etc. According to some embodiments, an indicator light is provided on a shelf where an item is placed or the item monitoring terminal, and the fourth prompt information may be provided by lighting a red indicator light, which may be lighten in a mode of being always bright or blinking etc.

In this way, the current scanning result is compared with the previous scanning result to obtain the different item information, then the different item information is compared with the item pick-up task list, to determine whether the pick-up operation is correct, and when the picked items are correct, a positive reminder (the third prompt message) is provided, and when the picked items are wrong, a warning reminder (the fourth prompt message) is provided to enable the user to quickly determine whether there is an event that an item is wrongly picked up.

As an alternative embodiment, the processing circuit 52 is further configured to determine whether a number of items corresponding to the different item information is consistent with a number of corresponding items to be picked up in the item pick-up task list.

The output circuit 53 is further configured to output fifth prompt information if the number of items corresponding to the different item information is not consistent with the number of the corresponding items to be picked up in the item pick-up task list, to remind the operator that there is a wrong number of picked items due to the current pick-up operation.

According to some embodiments, the method for determining that the number of picked items is inconsistent may be to count a number of each type of picked items, and when a number of a certain type of picked items exceeds a number of items to be picked up in the item pick-up task list, determine that the number of picked items is inconsistent.

According to some embodiments, the fifth prompt information may be output by means of voice broadcast, screen display, etc. According to some embodiments, an indicator light is provided on a shelf where an item is placed or the item monitoring terminal, and the fifth prompt information may be provided by lighting a red indicator light, which may be lighten in a mode of being always bright or blinking etc.

As an alternative embodiment, the item monitoring terminal further includes a display 57 configured to display the item pick-up task list and the different item information. In this way, the item pick-up task list is displayed, so that the user may complete pick-up of items with the cooperation of displaying the different item information for the user's reference. According to some embodiments, the display 57 may be implemented using a low power E-ink electronic paper (as shown in FIG. 6).

According to some embodiments, the display 57 may display the item pick-up task list and the different item information in real time in the pick-up process, so that the user may be reminded of the items the user currently picks up in real time.

In addition, as an alternative implementation, if the items corresponding to the different item information do not belong to the item pick-up task list, but belong to the illegal item list, the output unit 53 may not provide any reminder.

In addition, considering that the RFID read/write module has high operating power consumption (at rated operating current of about 500 mA) and is always in a scanning and communication state, the item monitoring terminal may be powered by external +12 V DC. In addition, a key may further be disposed on the item monitoring terminal to perform a key operation of, for example, turning on/off the item monitoring terminal.

According to an embodiment of the present disclosure, there is proposed an item monitoring system, which may at least partially address the matter that an item is misplaced.

Figure 7:
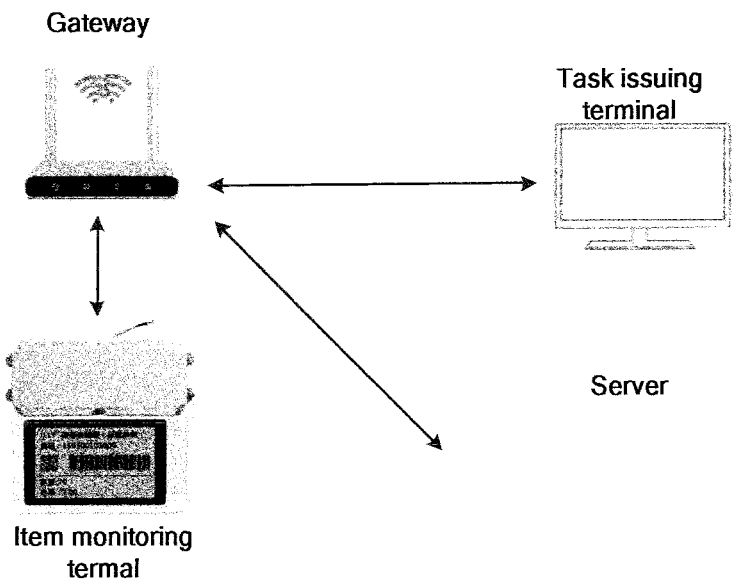
FIG. 7 is a schematic structural diagram of an item monitoring system according to an embodiment of the present disclosure.

The item monitoring system, as shown in FIG. 7, includes a server, and an arrangement or combination of any one or more embodiments of the item monitoring terminal described above. The server is configured to store item information and tag information of all items currently stored in the item monitoring terminal. According to some embodiments, there are a plurality of item monitoring terminals, and the plurality of item monitoring terminals are disposed at respective places at a density which may be determined by a range covered by the item monitoring terminals. Preferably, the item monitoring terminals are disposed on shelves in a one-to-one correspondence, that is, one item monitoring terminal is correspondingly disposed on one shelf. According to some embodiments, the item monitoring system further includes a gateway configured to implement communication between the server and the task issuing terminal and the item monitoring terminal. There may also be a plurality of gateways, and the plurality of gateways may be arranged at a density which may be determined to meet a communication rate and receive wireless signals from a certain number of item monitoring terminals.

Figure 8:
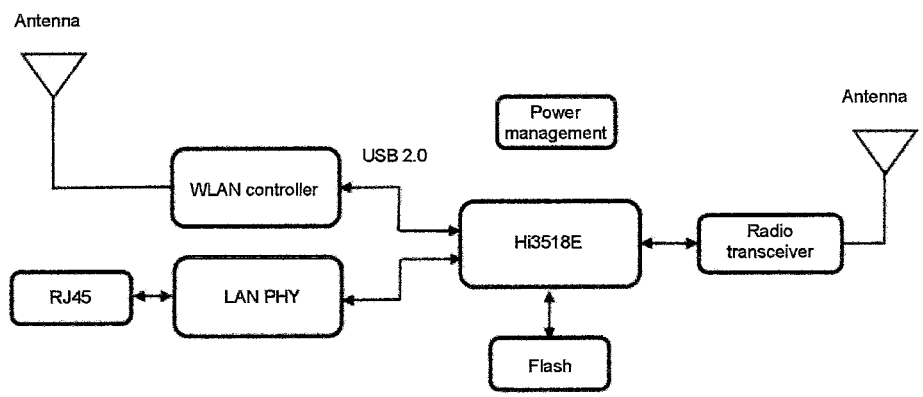
FIG. 8 is a schematic hardware structural diagram of a gateway according to an embodiment of the present disclosure.

FIG. 8 illustrates a hardware structural diagram of a gateway. According to some embodiments, from the perspective of the function of the system, the gateway does not have high requirements on a processor, a network coprocessor, and a memory; and under the premise of satisfying the function and performance requirements of the system, it is desirable that a cost of the gateway is as low as possible. The gateway architecture in this system is mainly composed of high performance low power Hi3518E processor (ARM)+ Sub-GHz transceiver (Si4463)+USB to Wi-Fi chip+SPI Flash. A core of the Hi3518E processor is ARM926@540 MHz, which is integrated with 64 MByte 16-bit DDR2 SDRAM, and supports SPI NOR flash boot. Hardware which is designed based thereon has high performance-price ratio and low power consumption. The Wi-Fi function is implemented using RTL8811AU. The WLAN controller chip supports 802.11ac/abgn and has a control and data interface being USB 2.0. There is an SPI interface between the processor and the Sub-GHz RF transceiver and a USB 2.0 interface between the processor and the Wi-Fi chip. The gateway implemented based on the above solution has simple circuit architecture, does not require a complicated external storage circuit, and has low cost of articles and PCBs while maintaining good performance and extremely low power consumption.

In terms of software architecture, the gateway needs to process data of the plurality of item monitoring terminals and interaction between the plurality of item monitoring terminals and the server in time, has high requirement on a data bandwidth and storage, and further needs to realize the high-performance Wi-Fi. Therefore, the gateway is implemented using the WLAN controller chip with a USB interface, which provides a complete Linux kernel for driving, and may directly perform upper-layer network programming.

According to some embodiments, as shown in FIG. 7, the item monitoring system further includes a task issuing terminal configured to transmit an item pick-up task list to the item monitoring terminal. The task issuing terminal may be operated by a staff member to input the item pick-up task list, and then the server issues the item pick-up task list to the corresponding item monitoring terminal.

As an embodiment, the item monitoring system is composed of the item monitoring terminal, the gateway, the server, and the task issuing terminal. Here, main functions of the server comprise: centralized management of the item monitoring system, comprising management of the gateway and a tag database, management of an item database, etc. Main functions of the task issuing terminal comprise: a user interface (UI) and issuing of tasks of putting an item in a warehouse and taking an item out of a warehouse. Main functions of the gateway comprise: simultaneous support for Wi-Fi, LAN and Sub-GHz communication, communication protocol conversion, and data communication between the server and the item monitoring terminal. Main functions of the item monitoring terminal comprise: communication with the server via the gateway in the Sub-GHz frequency band. The item monitoring terminal has an electronic paper (as shown in FIG. 6) provided thereon, and is configured to display information of items on a current shelf or information of items to be picked up. The item monitoring terminal further has a dual-color (red and green) LED light provided thereon which is configured to prompt a user with an operation result. There is Sub-GHz communication between the item monitoring terminal and the gateway, and the item monitoring terminal and a paper radio frequency identification tag on an item communicate through the ISO 18000-6C standard in the UHF (860 MHz-960 MHz) frequency band, and there is data interaction between the gateway and the server via Wi-Fi/LAN.

An operating process of the item monitoring system will be briefly described below.

Firstly, the entire system will be configured completely, that is, content (comprising information such as item names, models etc.) of radio frequency identification tags of items in each shelf have been written, each item monitoring terminal is placed at its corresponding shelf and is configured to manage one or more items, and the item monitoring terminal may automatically scan and access a gateway with the best communication performance. Each gateway forms a star network unit with all item monitoring terminals in its coverage, and a plurality of such star network units form a cellular network and are connected to the server through one or more wireless Access Points (APs). A database of the server stores corresponding models of current items of all the item monitoring terminals and tag IDs of the radio frequency identification tags, and tag tables of the item monitoring terminals which are stored in various gateways.

When the system operates normally, the item monitoring terminal may periodically perform scanning continuously at a high speed (at an identification rate up to 500 sheets/second), read all the radio frequency identification tags on a shelf where it is located, form an item storage list (comprising item names, model numbers, and chip IDs, etc.), store the item storage list in a flash, and maintain the item storage list (for example, add items, delete items etc.), while the item monitoring terminal may also periodically perform heartbeat connection with the gateway to facilitate the system to manage its status. In order to reduce an amount of wireless transmission data and channel congestion, the item monitoring terminal caches item update information in a queue manner, and performs detection on Received Signal Strength Indication (RSSI) received by a channel before transmitting the item update information to avoid collisions. If there is no change in the items in the coverage of the item monitoring terminal, no data is transmitted to the server; and if radio frequency identification tags are added or removed, only changed tag information is transmitted.

It may be seen from the above embodiments that the item monitoring system has characteristics such as accurate detection of items put in or taken out of a warehouse, intelligent management and control, a low cost, convenience and practicality etc.; and may accurately detect matters of wrongly taking items, misplacing items, and taking excessive items, which effectively reduces manual operations. The system uses RFID identification+Sub-GHz communication to realize accurate identification and determination of the RFID tags of the items on shelves in its coverage, which effectively solves the matters of wrongly taking items, misplacing items, and taking excessive items etc. when items are picked up manually. The system realizes prompting, accurate statistics and wireless upload of the operation result of the items, and realizes intelligent inventory management; the system may distinguish and process information of the RFID tags read by the RFID communication terminal, identify the operations of wrongly taking items, misplacing items, and taking excessive items etc., provide corresponding prompts, and transmit the operation result to a background through a Sub-GHz communication unit in a card reader, thereby realizing intelligent management of information of items in the warehouse.

In addition, the apparatus, device, etc. described in the present disclosure may typically be various electronic terminal devices, such as a mobile phone, a Personal Digital Assistant (PDA), a Portable Device (PAD), a smart TV, etc., or may also be large terminal devices, such as a server etc., and thus the protection scope of the present disclosure should not be limited to a particular type of apparatus or device. The client described in the present disclosure may be applied to any of the above electronic terminal devices in a form of electronic hardware, computer software, or a combination thereof.

Further, the method according to the present disclosure may also be implemented as a computer program executed by a CPU, which may be stored in a computer readable storage medium. The computer program, when executed by the CPU, executes the above functions defined in the method according to the present disclosure.

Further, the method steps and system units described above may also be implemented with a controller and a computer readable storage medium for storing a computer program which causes the controller to implement the steps or unit functions described above.

In addition, it should be understood that the computer readable storage medium (for example, a memory) described herein may be either a volatile memory or a nonvolatile memory, or may comprise both a volatile memory and a nonvolatile memory. By way of example and not limitation, the non-volatile memory may comprise a Read Only Memory (ROM), a Programmable ROM (PROM), an Electrically Programmable ROM (EPROM), an Electrically Erasable Programmable ROM (EEPROM), or a flash. The volatile memory may comprise a Random Access Memory (RAM), which may act as an external cache memory. By way of example and not limitation, the RAM may be obtained in a variety of forms, such as a Synchronous RAM (SRAM), a Dynamic RAM (DRAM), a Synchronous DRAM (SDRAM), a Double Data Rate SDRAM (DDR SDRAM), an Enhanced SDRAM (ESDRAM), a Synchronous Link DRAM (SLDRAM) and a Direct RambusRAM (DRRAM). The storage device according to the aspects disclosed is intended to comprise, but not limited to, these and other suitable types of memories.

It should also be understood by those skilled in the art that the various illustrative logical blocks, modules, circuits, and algorithm steps described in connection with the present disclosure herein may be implemented as electronic hardware, computer software, or a combination thereof. In order to clearly illustrate the interchangeability of hardware and software, functions of various illustrative components, blocks, modules, circuits, and steps have been generally described. Whether such functionality is implemented as software or as hardware depends on a particular application and design constraints imposed on the overall system. Those skilled in the art may implement the described functions in various ways for each specific application, but such implementation decisions should not be construed as depart from the scope of the present disclosure.

The various exemplary logical blocks, modules, and circuits described in connection with the present disclosure herein may be implemented or executed with the following components designed to perform the functions described herein: general purpose processors, Digital Signal Processors (DSPs), Application Specific Integrated Circuits (ASICs), Field Programmable Gate Arrays (FPGAs) or other programmable logic devices, discrete gates or transistor logics, discrete hardware components, or any combination thereof. The general purpose processor may be a microprocessor, but alternatively, the processor may be any conventional processor, controller, microcontroller, or state machine. The processor may also be implemented as a combination of computing devices, for example, a combination of a DSP and a microprocessor, a plurality of microprocessors, one or more microprocessors in conjunction with a DSP core, or any other such configuration.

The steps of the method or algorithm described in connection with the present disclosure herein may be included directly in hardware, in a software module executed by a processor, or a combination thereof. The software module may reside in a RAM memory, a flash, a ROM memory, an EPROM memory, an EEPROM memory, a register, a hard disk, a removable disk, a CD-ROM, or any other form of storage medium known in the art. The exemplary storage medium is coupled to the processor, so that the processor may read information from the storage medium or write information to the storage medium. In an alternative solution, the storage medium may be integrated with the processor. The processor and the storage medium may reside in the ASIC. The ASIC may reside in the user terminal. In an alternative solution, the processor and the storage medium may reside as discrete components in the user terminal.

In one or more exemplary designs, the functions may be implemented in hardware, software, firmware, or any combination thereof. If implemented in software, the functions may be stored on a computer readable medium as one or more instructions or codes or transmitted through a computer readable medium as one or more instructions or codes. The computer readable medium comprises both a computer storage medium and a communication medium including any medium which facilitates transfer of a computer program from one location to another. The storage medium may be any available medium which may be accessed by a general purpose or special purpose computer. By way of example and not limitation, the computer readable medium may comprise a RAM, a ROM, an EEPROM, a CD-ROM or other optical disk storage device, disk storage device or other magnetic storage device, or any other medium which may be used for carrying or storing a required program code in a form of instructions or data structure and may be accessed by a general purpose or special purpose computer or a general purpose or special purpose processor. Also, any connection may be properly referred to as a computer readable medium. For example, if a coaxial cable, a fiber cable, a twisted pair, a Digital Subscriber Line (DSL), or wireless technology such as infrared, radio, and microwave is used to transmit software from a website, a server, or other remote source, the coaxial cable, the fiber cable, the twisted pair, the DSL, or the wireless technology such as infrared, radio, and microwave are all included in the definition of media. As used herein, a magnetic disk and an optical disk comprise a Compact Disk (CD), a laser disk, an optical disk, a Digital Versatile Disk (DVD), a floppy disk, and a Blu-ray disk, in which the magnetic disk generally reproduces data magnetically, and the optical disk optically reproduces data using a laser. Combinations of the above content should also be included within the scope of the computer readable media.

The exemplary embodiments have been disclosed above, but it should be illustrated that there may be a plurality of changes and amendments without departing from the scope of the present disclosure as defined by the claims. The functions, steps and/or actions of the method claims according to the embodiments disclosed herein are not required to be performed in any particular order. In addition, although elements of the present disclosure may be described or claimed in an individual form, a plurality of elements may be conceived unless explicitly limited to a singular form.

It should be understood that as used herein, the singular forms "a", "an", "the" are intended to comprise a plural form unless the context clearly supports exceptions. It should also be understood that "and/or" as used herein is intended to comprise any and all possible combinations of one or more of the associated items listed.

The above serial numbers of the embodiments of the present disclosure are merely for the description, and do not represent advantages and disadvantages of the embodiments.

It may be understood by those of ordinary skill in the art that all or a part of the steps of implementing the above embodiments may be completed by hardware, or may also be completed by a program instructing related hardware, and the program may be stored in a computer readable storage medium. The above storage medium may be a read only memory, a magnetic disk or an optical disk etc.

It should be understood by those of ordinary skill in the art that the discussion of any of the above embodiments is merely exemplary, and is not intended to imply that the scope of the present disclosure (including the claims) is limited to these examples. Under the concept of the embodiments of the present disclosure, the technical features in the above embodiments or in the different embodiments may also be combined, there are many other variations of the various aspects of the embodiments of the present disclosure as described above, and details thereof are not provided for the sake of brevity. Therefore, any omissions, modifications, equivalent substitutions, improvements, etc. which are made within the spirit and scope of the embodiments of the present disclosure are intended to be included within the protection scope of the embodiments of the present disclosure.

I claim:

1. An item monitoring method performed by an item monitoring terminal fixed in a preset range, wherein the item monitoring terminal comprises a scanning identification circuit, a processing circuit connected to the scanning identification circuit, and an output circuit connected to the processing circuit, and the scanning identification circuit comprises a RFID reader and writer having an operating frequency band of 840-960 MHz connected to the processor circuit and a UHF circularly polarized narrow beam antenna connected to the RFID reader and writer, the method comprising:
  scanning, by the scanning identification circuit, a radio frequency identification tag of an item within the preset range according to a preset scanning period using radio frequency identification technology, and acquiring item information in the radio frequency identification tag;
  determining, by the processing circuit, whether the item corresponding to the item information belongs to an item scope covered by the preset range; and
  outputting, by the output circuit, first prompt information indicating that the item is misplaced, in response to determining that the item corresponding to the item information does not belong to the item scope covered by the preset range,
the method further comprising:
  acquiring tag information in the radio frequency identification tag;
  determining, according to the tag information, whether the item corresponding to the tag information is a new item;
  storing, in response to determining that the item corresponding to the tag information is a new item, item information and tag information of the new item, and uploading the item information and the tag information of the new item to a server;
  determining whether the new item belongs to the item scope covered by the preset range;
  outputting second prompt information in response to determining that the new item belongs to the item scope covered by the preset range; and
  outputting the first prompt information in response to determining that the new item does not belong to the item scope covered by the preset range,
wherein storing, in response to determining that the item corresponding to the tag information is a new item, item information and tag information of the new item, and uploading the item information and the tag information of the new item to a server comprises:
  storing item information and tag information of the new item in an item storage list if the new item is detected by scanning in a next scanning period, which indicates that the new item has been placed within the preset range monitored by the item monitoring terminal;
  storing item information and tag information of the new item in an illegal item list in response to determining that the new item does not belong to the item scope covered by the preset range; and
  uploading the item storage list and the illegal item list to the server when a connection is established with the server,
wherein the preset scanning period is a time required for the item monitoring terminal to scan all items within the preset range, and if the item monitoring terminal reads a radio frequency identification tag by scanning during the preset scanning period, it is determined that an item corresponding to the radio frequency identification tag is placed within the preset range monitored by the item monitoring terminal.

2. The method according to claim 1, further comprising:
  acquiring an item pick-up task list;
  scanning radio frequency identification tags of items within the preset range according to the preset scanning period and generating an item storage list;
  comparing an item storage list which is currently obtained by scanning with an item storage list which is previously obtained by scanning to obtain different item information;
  determining whether items corresponding to the different item information belong to the item pick-up task list;
  outputting third prompt information in response to determining that the items corresponding to the different item information belong to the item pick-up task list; and
  outputting fourth prompt information in response to determining that the items corresponding to the different item information do not belong to the item pick-up task list.

3. The method according to claim 2, further comprising:
  determining whether a number of items corresponding to the different item information is consistent with a number of corresponding items to be picked up in the item pick-up task list, and
  outputting fifth prompt information in response to determining that the number of items corresponding to the different item information is not consistent with the number of the corresponding items to be picked up in the item pick-up task list.

4. The method according to claim 2, further comprising:
  displaying the item pick-up task list and the different item information.

5. An item monitoring terminal, comprising:
  a scanning identification circuit configured to scan a radio frequency identification tag of an item within a preset range according to a preset scanning period using radio frequency identification technology, and acquire item information in the radio frequency identification tag;

a processing circuit configured to determine whether the item corresponding to the item information belongs to an item scope covered by the preset range; and an output circuit configured to output first prompt information indicating that the item is misplaced, if the item corresponding to the item information does not belong to the item scope covered by the preset range, wherein the item monitoring terminal is fixed in the preset range, and wherein the item monitoring terminal comprises a scanning identification circuit, a processing circuit connected to the scanning identification circuit, and an output circuit connected to the processing circuit, and the scanning identification circuit comprises a RFID reader and writer having an operating frequency band of 840-960 MHz connected to the processor circuit and a UHF circularly polarized narrow beam antenna connected to the RFID reader and writer, wherein the scanning identification circuit is further configured to acquire tag information in the radio frequency identification tag; the processing circuit is further configured to determine whether the item corresponding to the tag information is a new item according to the tag information; and the terminal further comprises a memory configured to store item information and tag information of the new item if the item corresponding to the tag information is a new item and a transmitting circuit configured to upload the item information and the tag information of the new item to a server;

wherein the processing circuit is further configured to determine whether the new item belongs to the item scope covered by the preset range; and the output circuit is further configured to output second prompt information if the new item belongs to the item scope covered by the preset range and output the first prompt information if the new item does not belong to the item scope covered by the preset range;

wherein the memory is configured to store item information and tag information of the new item in an item storage list if the new item is detected by scanning in a next scanning period, which indicates that the new item has been placed within the preset range monitored by the item monitoring terminal, and store item information and tag information of the new item in an illegal item list in response to determining that the new item does not belong to the item scope covered by the preset range; and the transmitting circuit is configured to upload the item storage list and the illegal item list to the server when a connection is established with the server; and wherein the preset scanning period is a time required for the item monitoring terminal to scan all items within the preset range, and if the item monitoring terminal reads a radio frequency identification tag by scanning during the preset scanning period, it is determined that an item corresponding to the radio frequency identification tag is placed within the preset range monitored by the item monitoring terminal.

6. The terminal according to claim 5, further comprising a receiving circuit configured to acquire an item pick-up task list;

the scanning identification circuit is further configured to scan radio frequency identification tags of items within the preset range according to the preset scanning period and generate an item storage list;

the processing circuit is further configured to compare an item storage list which is currently obtained by scanning with an item storage list which is previously obtained by scanning to obtain different item information, and determine whether items corresponding to the different item information belong to the item pick-up task list; and the output circuit is further configured to:

output third prompt information if the items corresponding to the different item information belong to the item pick-up task list; and output fourth prompt information if the items corresponding to the different item information do not belong to the item pick-up task list.

7. The terminal according to claim 6, wherein the processing circuit is further configured to determine whether a number of items corresponding to the different item information is consistent with a number of corresponding items to be picked up in the item pick-up task list, and the output circuit is further configured to:

output fifth prompt information if the number of items corresponding to the different item information is not consistent with the number of the corresponding items to be picked up in the item pick-up task list.

8. The terminal according to claim 6, further comprising: a display configured to display the item pick-up task list and the different item information.

9. An item monitoring system, comprising a server, and the item monitoring terminal according to claim 5, wherein the server is configured to store item information and tag information of all items which are currently stored in the item monitoring terminal.

10. The system according to claim 9, further comprising a task issuing terminal configured to transmit an item pick-up task list to the item monitoring terminal.

11. The system according to claim 10, further comprising a gateway configured to enable communication between the server and the task issuing terminal and the item monitoring terminal.

* * * * *